United States Patent [19]
Hayashi

[11] Patent Number: 5,261,286
[45] Date of Patent: Nov. 16, 1993

[54] MODULAR-TYPE WIPER DEVICE
[75] Inventor: Akira Hayashi, Gunma, Japan
[73] Assignee: Mitsuba Electric Mfg. Co., Ltd., Gunma, Japan
[21] Appl. No.: 915,307
[22] Filed: Jul. 20, 1992
[30] Foreign Application Priority Data Jul. 30, 1991 [JP] Japan ............................ 3-212702

[51] Int. Cl.$^5$ .............................................. F16H 21/00
[52] U.S. Cl. ........................................ 74/96; 15/250.3; 74/42; 74/51
[58] Field of Search ................... 74/42, 43, 51, 96; 15/250.3, 250.13, 250.31, 250.27, 250.16, 250.34

[56] References Cited

U.S. PATENT DOCUMENTS

| | | | |
|---|---|---|---|
| 3,100,423 | 8/1963 | D'Alba | 15/250.13 |
| 4,009,502 | 3/1977 | Tamaki et al. | 15/250.31 X |
| 4,477,293 | 10/1984 | Timmis | 74/42 X |
| 4,787,114 | 11/1988 | Okudaira | 74/42 X |
| 4,843,898 | 7/1989 | Ishikawa | 74/51 |
| 4,878,398 | 11/1989 | Heinrich | 74/42 X |
| 5,031,265 | 7/1991 | Nakatsukasa et al. | 15/250.13 |

FOREIGN PATENT DOCUMENTS

| | | | |
|---|---|---|---|
| 3333763 | 4/1985 | Fed. Rep. of Germany | 15/250.3 |
| 2028114 | 3/1980 | United Kingdom | 15/250.3 |
| 2227926 | 8/1990 | United Kingdom | 15/250.3 |

*Primary Examiner*—Leslie A. Braun
*Assistant Examiner*—William O. Trousdell
*Attorney, Agent, or Firm*—Oliff & Berridge

[57] ABSTRACT

In connecting brackets using a frame member for a wiper device, the frame member being of linear structure providing sufficient mechanical intensity, the brackets are formed of die cast employing a general purpose die referenced to the axes of sleeves for pivotal shafts. An axis A of the frame member is so arranged that it is contained in the third imaginary plane which is parallel with first and second imaginary planes, wherein the first and second imaginary planes are selected respectively from imaginary planes which contain an axis B of a first pivotal shaft and from imaginary planes which contain an axis C of a second pivotal shaft 6, so that the first and second imaginary planes are parallel with each other.

13 Claims, 10 Drawing Sheets

MODULAR-TYPE WIPER DEVICE

BACKGROUND OF THE INVENTION

1. Field of the Invention

The present invention relates to a modular-type wiper device mounted on cars, buses, trucks or the like.

2. Description of the Related Art

Among wiper devices of this kind, there is a so-called modular-type wiper device into which components, such as a pair of right and left pivotal shafts, a wiper drive motor and wiper link mechanism, are integrated as a single modular unit. Today, such a modular type has been popularly employed because of the advantages as follows: compared to a type which is formed of components each of which is individually assembled into a vehicle's body, the modular type not only makes mounting operation easier because the modular unit into which all components are already integrated is assembled into the main body (frame), but also allows additional design reinforcement as needed, without design consideration to component-to-component intensity match to the main body side.

In such a prior art modular type, however, an entire bracket holding a wiper drive motor and a wiper link mechanism is made of a one-body construction of cast aluminum or cast zinc. Thus, the bracket itself is bulky and heavy. Furthermore, the die for forming the bracket is bulky and costly. It has been proposed, in an attempt to cope with this disadvantage, that the bracket itself be made compact and light weight by splitting it into two sections, a first bracket and a second bracket, the first bracket being connected to the second bracket by a frame member.

In most cases, to be suited to the configuration of the main body, a pair of right and left pivotal shafts of a wiper device is not arranged in a manner such that each shaft is parallel with the other shaft. When the first bracket is connected to the second bracket with the frame member to be one-body, the frame member is preferably of a linear structure, rather than a bent or twisted structure from the standpoint of manufacturing and mechanical strength. The frame member may be connected to each bracket using bolts or rivets. From the standpoint of assembly, it is required that the directions of insertion of bolts or the like be uniform. On the other hand, the brackets are formed of die cast using a die matched in reference to the axes of sleeves (the axes of the pivotal shafts) rotatably supporting the pivotal shafts. When connecting portions to be connected to the frame member are formed of die cast together with the sleeves, the axes of both sleeves are not aligned, and the mating surfaces of the connecting portions formed on the first and second brackets are not aligned in an attempt to connect both brackets with the frame member. Such an arrangement requires that a bent or twisted frame member be utilized, thereby making it impossible to keep the insertion directions of the bolts uniform. To ensure that the mating surfaces of the connecting portions are aligned in connecting the brackets, a complex combination of dies may be needed. Probably, special dies such as slide dies may be needed, requiring complicated and troublesome die control, presenting poor productivity, and consequently increasing the manufacturing cost.

SUMMARY OF THE INVENTION

The present invention has been developed to provide a modular-type wiper device which overcomes the above-mentioned disadvantages. The modular-type wiper device is made of a first bracket having a sleeve receiving a first pivotal shaft, a mounting portion to be secured to a vehicle's body and a motor base portion for a wiper drive motor, and a second bracket having a sleeve receiving a second pivotal shaft and a mounting portion to be secured to the vehicle's body, with each of the first bracket and the second bracket formed of one-body of aluminum die cast or zinc die cast, with both the first bracket and the second bracket formed in a modular construction by connecting each end portion of a linear frame member to a connecting portion formed on each bracket, wherein the axis of the frame member is contained in a third imaginary plane which is parallel with both a first imaginary plane and a second imaginary plane, in which the first imaginary plane is selected from among the imaginary planes which contain the first pivotal shaft, and the second imaginary plane is selected from among the imaginary planes which contain the second pivotal shaft, in a manner such that the first imaginary plane and the second imaginary plane are in parallel with each other.

According to the present invention, although the first bracket and the second bracket, connected with each other to form a modular construction by means of the frame member, are formed of die cast using ordinary dies matched in reference to the axes of the sleeves, the mating surfaces of the connecting portions of the brackets for connection with the frame member are allowed to be aligned.

BRIEF DESCRIPTION OF THE DRAWINGS

The invention will be described with reference to the following figures, wherein.

DETAILED DESCRIPTION OF PREFERRED EMBODIMENT

Referring now to the drawings, an embodiment of the present invention is described. Indicated at 1 in the drawings is a modular-type wiper device. The modular-type wiper device 1 comprises a first bracket 2 and a second bracket 5. The first bracket 2 is made of a first sleeve 2a which rotatably supports a first pivotal shaft 3 on one side, a mounting portion 2b which is secured to the main body and a motor base portion 2c on which a wiper drive motor 4 is mounted. The second bracket 5 is made of a second sleeve (5a) which rotatably supports a second pivotal shaft 6 on the other side and a mounting portion 5b which is secured to the main body. Each of the first bracket 2 and the second bracket 5 is made of one-body structure of aluminum die cast (zinc die cast is an acceptable alternative). The first and second brackets have respectively connecting portions 2d and 5c, the cross-sections of which are U-shaped. A linear frame member 7, the cross-section of which is also U-shaped, is engaged, on its end portions, with the connecting portions 2d and 5c on their inside surfaces. The frame member 7 is secured to the connecting portions 2d and 5c by bolts and nuts 8, forming a modular-type wiper device 1. A first wiper link 21 is disposed between the motor arm (not shown) fixed onto the motor shaft of a wiper drive motor 4 and a link arm 20 on the pivotal shaft 6 of the second bracket 5. A second wiper link 23 is disposed between the link arm 20 and a link arm 22 on the pivotal shaft 3 of the first bracket 2. Indicated at 19 in the figures are pivot caps mounted on the pivotal shafts 3 and 6.

Figure 1:
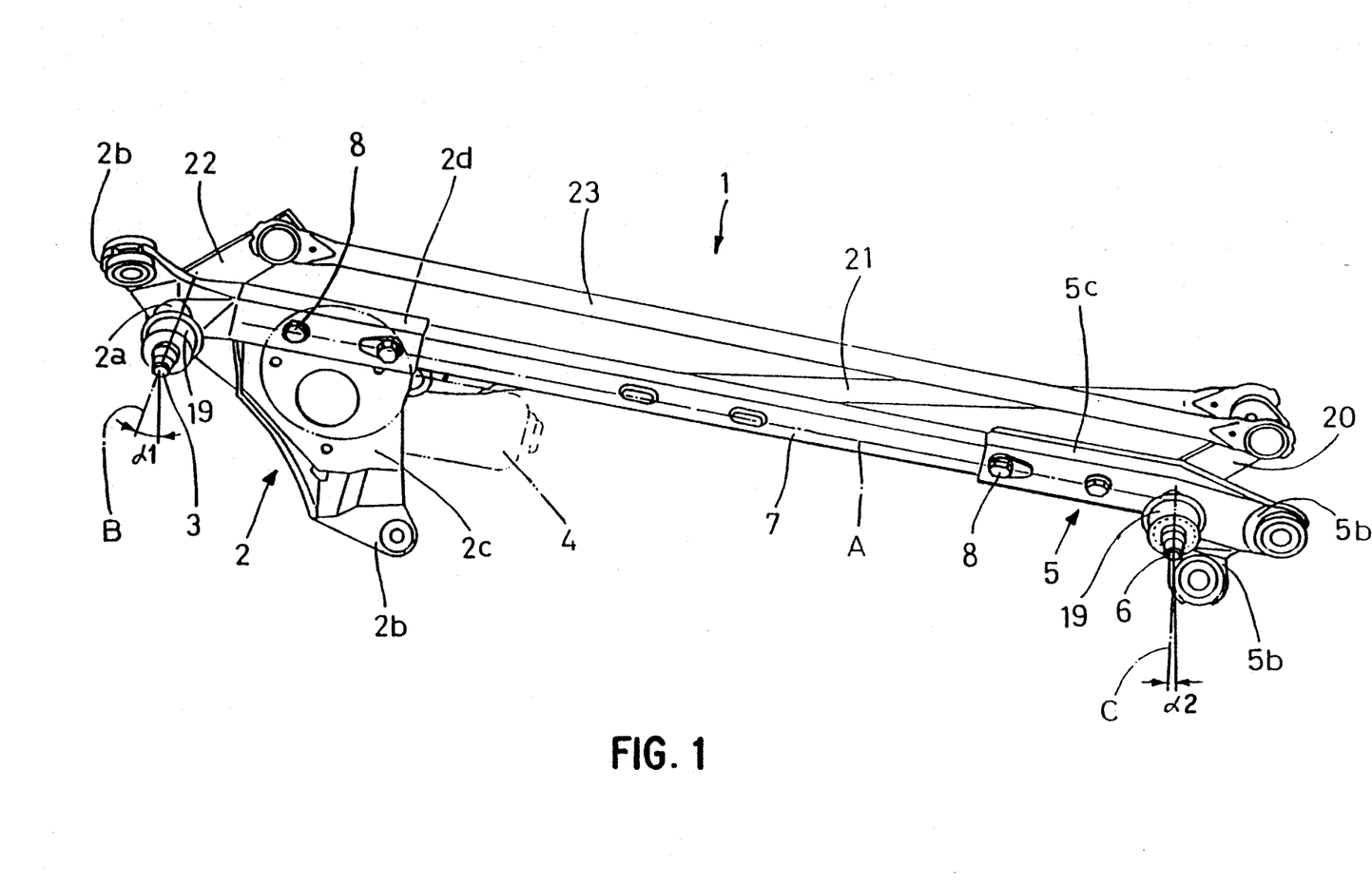
FIG. 1 is a plan view of the wiper device.
Figure 2:
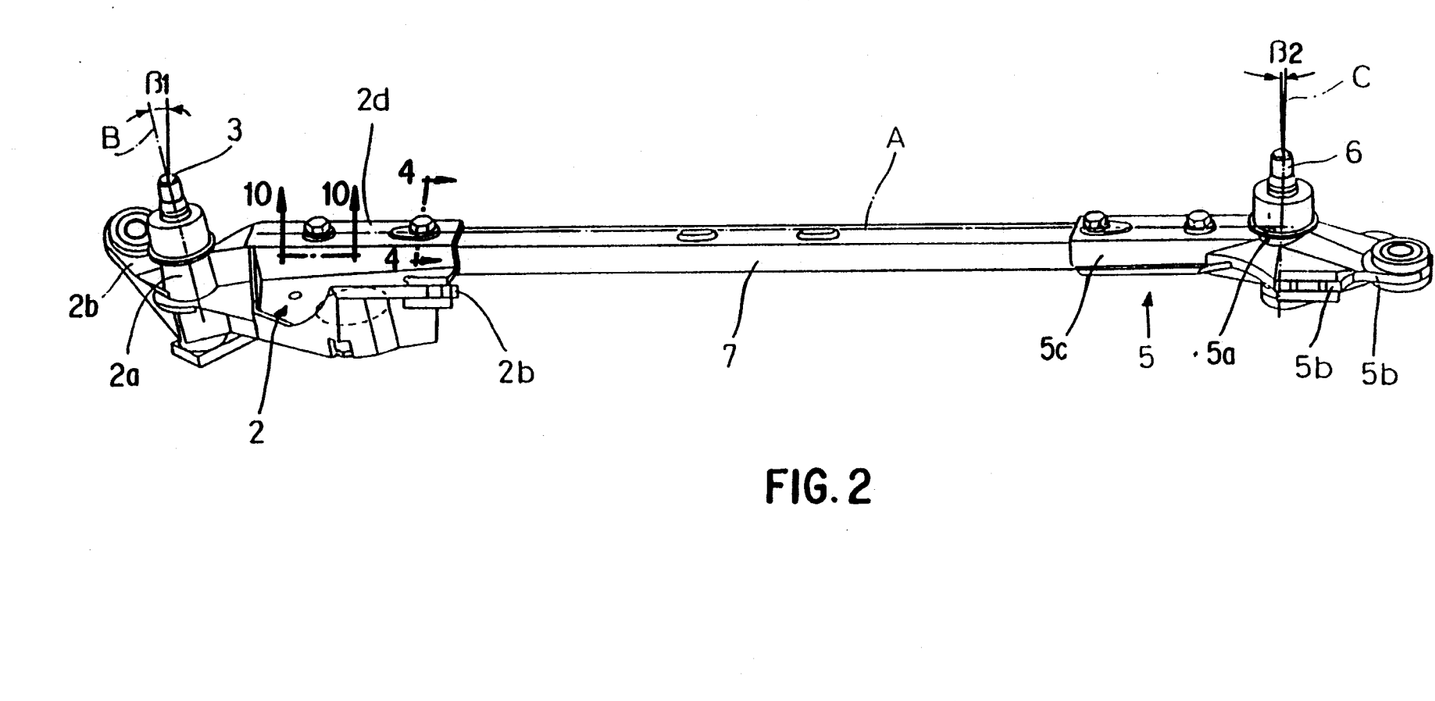
FIG. 2 is a front view of the wiper device without the wiper drive motor and the wiper link mechanism.
Figure 3:
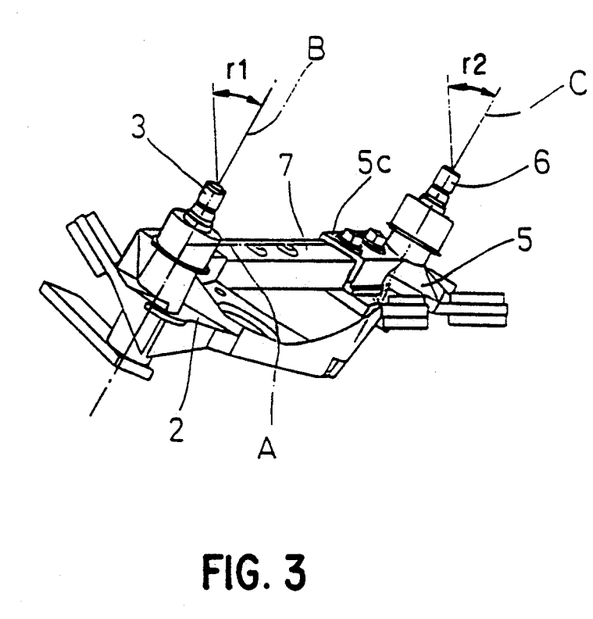
FIG. 3 is a left-hand side view of FIG. 2.
Figure 4:
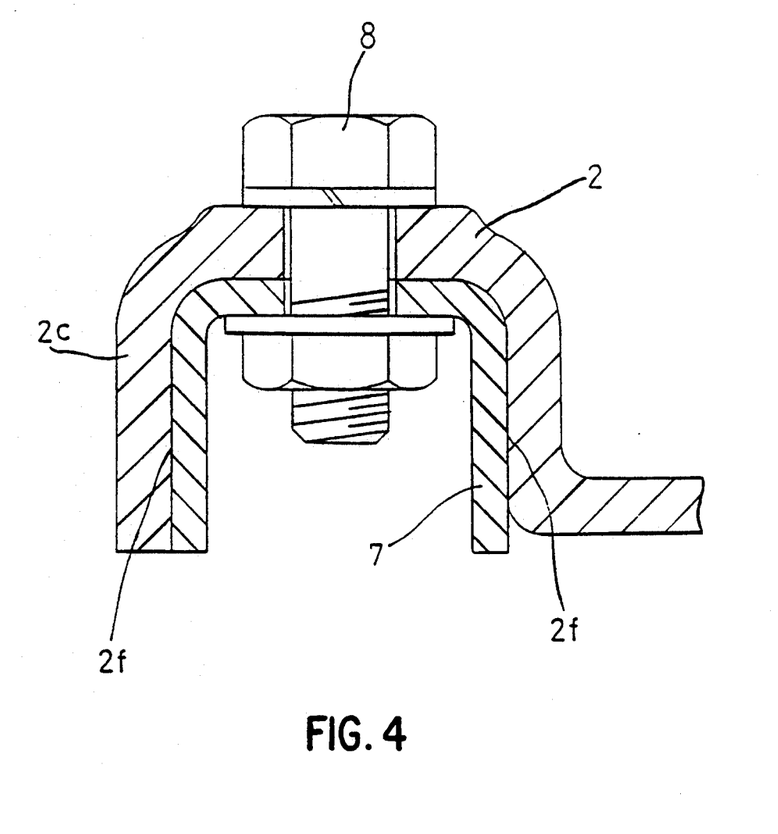
FIG. 4 is an enlarged cross-sectional view taken along 4—4 in FIG. 2.
Figure 5A:
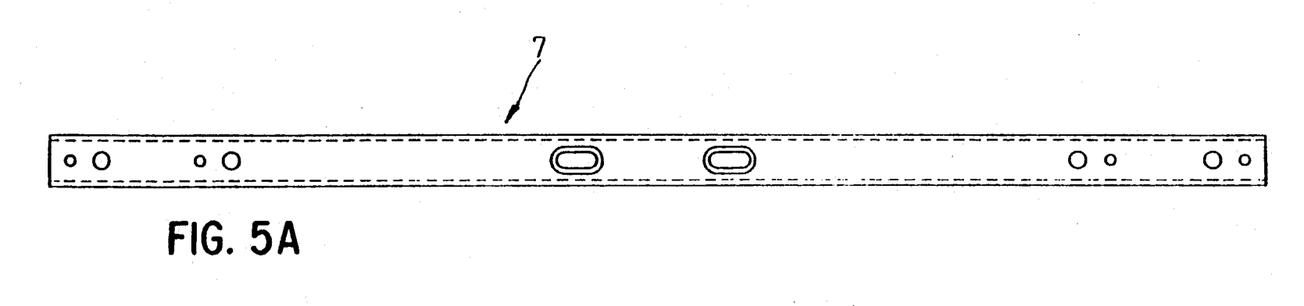
FIG. 5(X) is a front view of the frame member.
FIG. 5(Y) is a front view, partially in cross-section, of the frame member.
FIG. 5(Z) is a side view of the frame member.
Figure 5B:
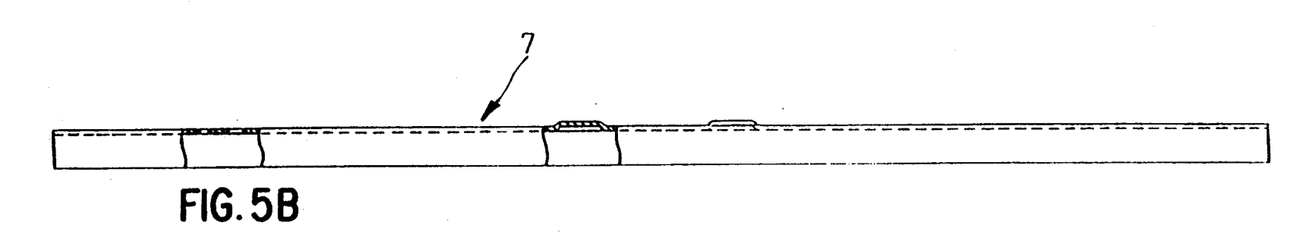
Figure 5C:
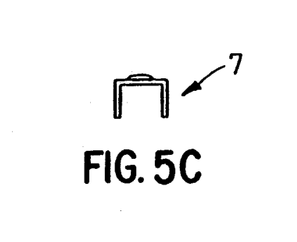

In the above construction, the longitudinal axes of both pivotal shafts 3 and 6, i.e., the longitudinal axes B and C of the first and second sleeves 2a and 5a, respectively, are arranged as described below with respect to the longitudinal line A of the frame member 7. The longitudinal axes B and C of the first and second pivotal shafts 3 and 6 are not aligned with each other three-dimensionally in order to match the configuration of the vehicle's body and the shape of the vehicle's windshield. FIG. 1 is a plan view of the wiper device actually mounted on the vehicle's body, taken from above; FIG. 2 is a front view of the wiper device 1, taken from front; and FIG. 3 is a side view of the wiper device 1, taken from the left side. As seen from these figures, the longitudinal axes B and C of pivotal shafts 3 and 6 are aligned neither in a vertical direction nor in a horizontally transverse direction (angle $\alpha_1$ is different from angle $\alpha_2$, angle $\beta_1$ is different from angle $\beta_2$ and angle $\gamma_1$ is different from angle $\gamma_2$). Both axes B and C are not aligned three-dimensionally, and in this arrangement, the longitudinal axis line A of the frame member 7 is established as described below.

Figure 6A:
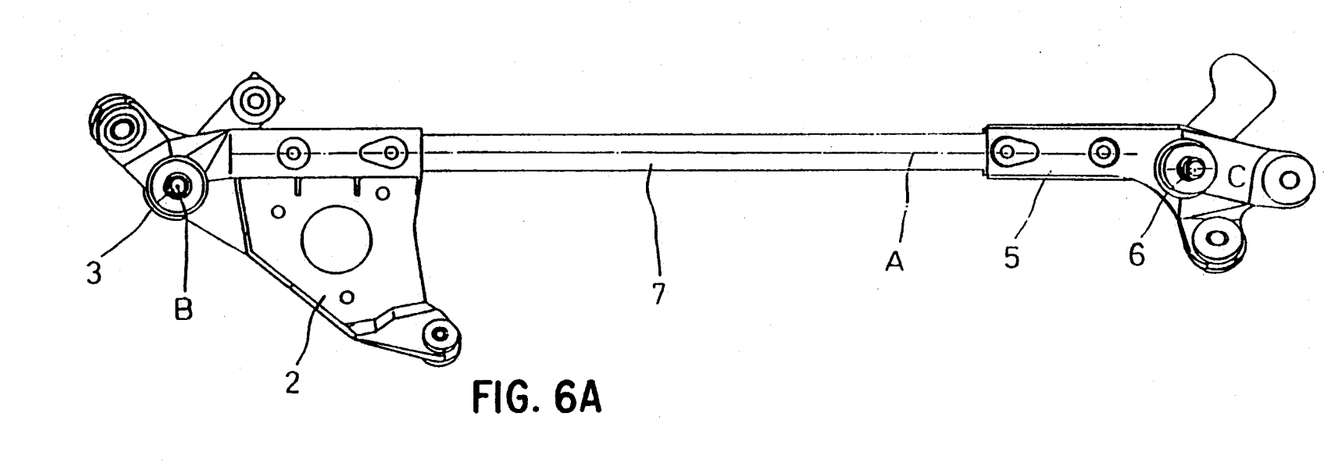
FIG. 6(X) is a view of the wiper device with the first pivotal shaft taken from directly above.
FIG. 6(Y) is a drawing explaining FIG. 6(X)
Figure 6B:
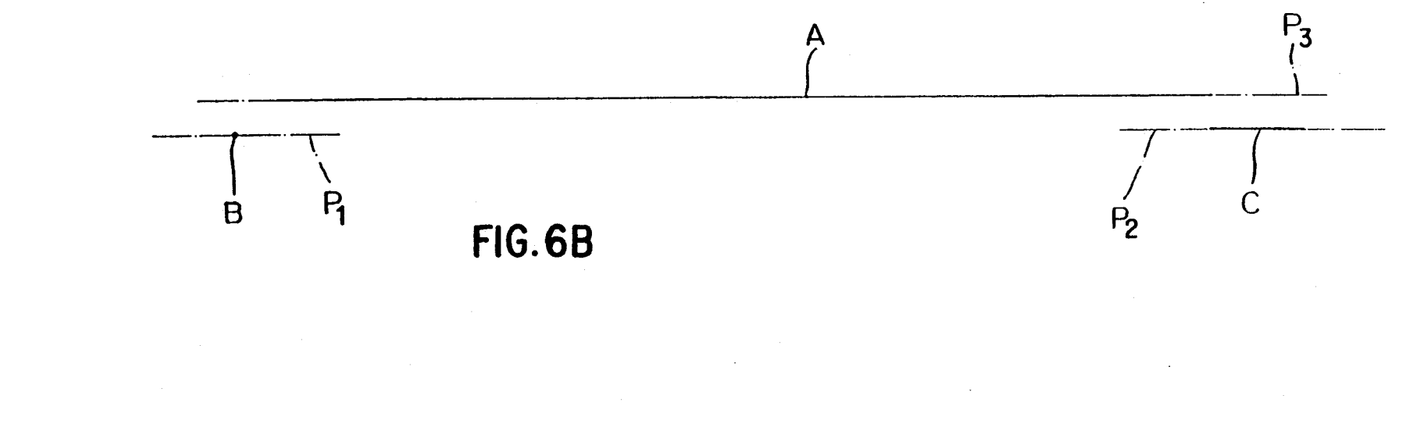
Figure 7:
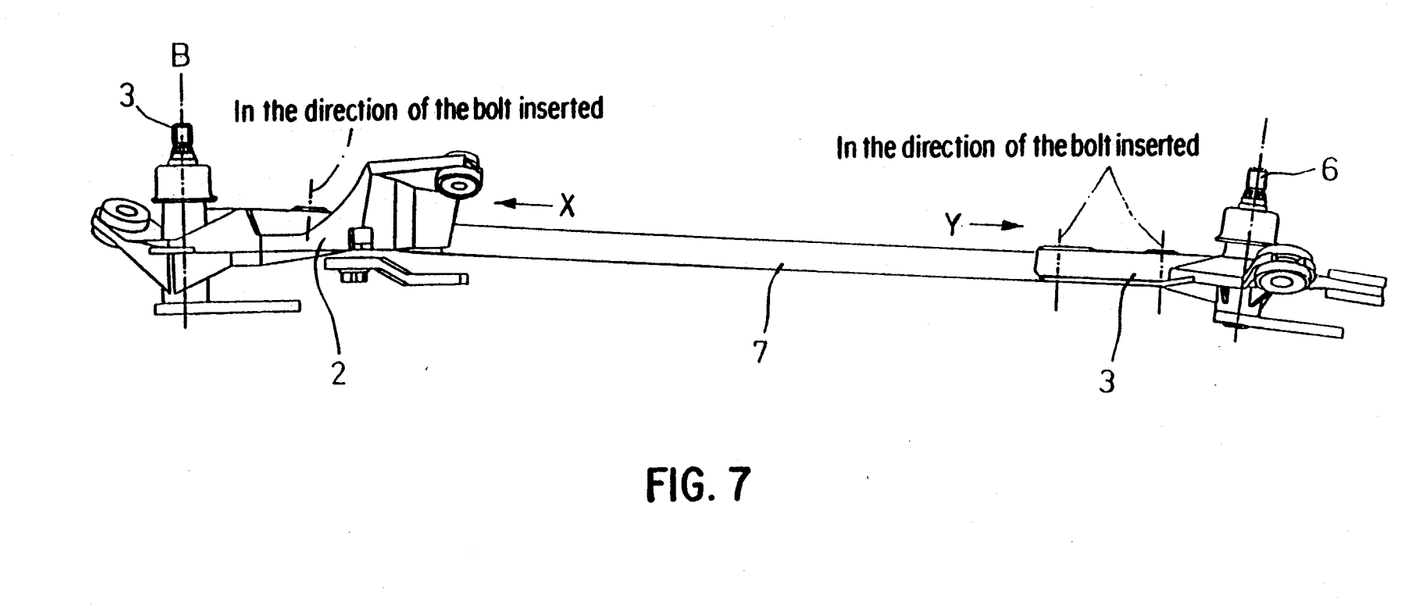
FIG. 7 is a view of the wiper device, taken from side in a manner that the first pivotal shaft is aligned vertically.
Figure 8A:
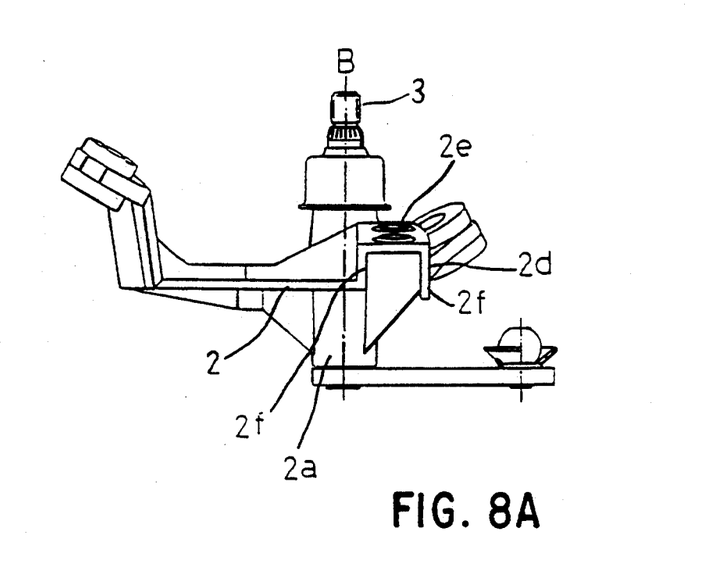
FIG. 8(X) is a view in the direction of the arrow X in FIG. 7.
FIG. 8(Y) is a view in the direction of the arrow Y in FIG. 7.
Figure 8B:
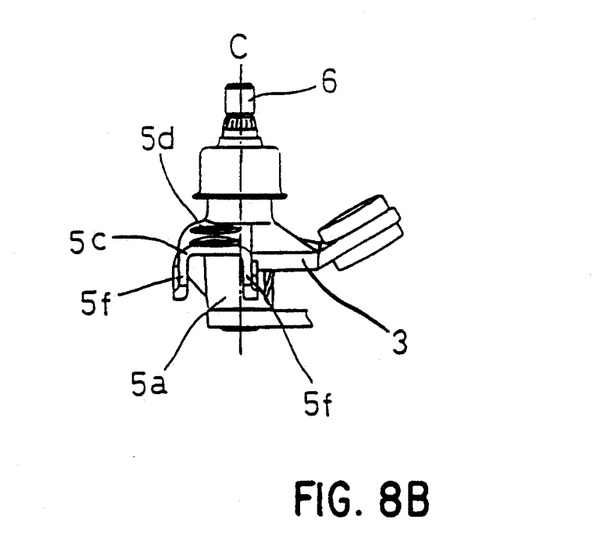
Figure 9:
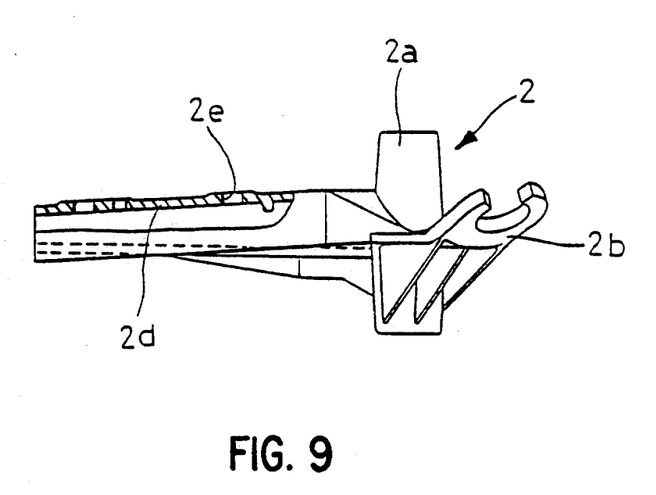
FIG. 9 is a rear view of the first bracket.

FIG. 6(X) is a top view of the wiper device 1, taken from directly above the first pivotal shaft 3, and FIG. 7 is a side view of the wiper device 1, taken from right side so that the first pivotal axis 3 is vertically aligned. Referring to these figures, the present invention will be described more in detail. When the first pivotal shaft 3 is viewed from directly above, as already mentioned, axis line B is depicted as a point as shown in FIG. 6(Y). On the other hand, the axis C of the second pivotal shaft 6 is depicted as a straight line. An infinite number of imaginary planes in which the axis B lies may be drawn, by rotating an imaginary plane around the axis B. Also, an infinite number of imaginary planes in which the axis C lies may be drawn, by rotating an imaginary plane round the axis C. From among imaginary planes of both groups, there exist imaginary planes which are parallel with each other. In FIG. 6(Y), imaginary planes in which the axis B lies are planes which are supposed to pierce the page of the picture at right angles. Among others, a plane of which direction agrees with the same direction as the axis C is designated a first imaginary plane $P_1$. A second imaginary plane $P_2$ containing the axis C is parallel with the first imaginary plane $P_1$, and is supposed to pierce the page of FIG. 6(Y) at right angles. A third imaginary plane $P_3$, which is parallel with both the first imaginary plane $P_1$ and the second imaginary lane $P_2$ formed as above, is arbitrarily established and the axis A of the frame member 7 is arranged in a manner that it is contained in the third imaginary plane $P_3$.

According to the embodiment of the present invention described above, the wiper device 1 is of modular-type made of the first and second brackets, both of which are connected with the frame; thus, the wiper device 1 is compact and light weight, and not so heavy and bulky as a full die-cast type of which an intermediate portion is also of die cast construction. Furthermore, in the above structure, the axis A of the frame member 7 is so arranged that it is contained in the third imaginary plane $P_3$ which is parallel with the first and second imaginary planes $P_1$ and $P_2$, wherein the first and second imaginary planes $P_1$ and $P_2$ are selected respectively from planes which contain the axis B of the first pivotal shaft 3 and from planes which contain the axis C of the second pivotal shaft 6 so that the first and second imaginary planes $P_1$ and $P_2$ are parallel with each other. In other words, when both the first pivotal shaft 3 and the second pivotal shaft 6 are viewed from above in a manner that the first pivotal shaft 3 looks like a point, for convenience of reference, the axis A of the frame member 7 is set parallel with the second pivotal shaft 6 with axis C, which is depicted as a straight line.

As a result, the connecting portions 2d and 5c formed on respective brackets 2 and 5 exist on a mutually common extension line. Furthermore, side walls 2f and 5f of connecting portions 2d and 5c can be arranged in parallel with the respective axes B and C of the first pivotal shaft 3 and the second pivotal shaft 6. The above arrangement allows the frame member 7 to be of linear structure, and the insertion directions of bolts 8 attaching the frame member 7 to both brackets 2 and 5 can be made uniform. Furthermore, when the first bracket 2 and the second bracket 5 are viewed in the direction of the axis A of the frame 7, side walls 2f and 5f of connecting portions 2d and 5c are parallel with the axes B and C of the first pivotal shaft 3 and the second pivotal shaft 6. Even if the cross-section of the connecting portions 2d and 5c is of an inverted U-shape, the connecting portions 2d and 5c are formed together with brackets 2 and 5, respectively, using simple dies matched in reference to the axes B and C of the first pivotal shaft 3 and the second pivotal shaft 6, i.e., the longitudinal axes of sleeves 2a and 5a. Therefore, there is no need for complex dies or special slide dies.

Figure 10:
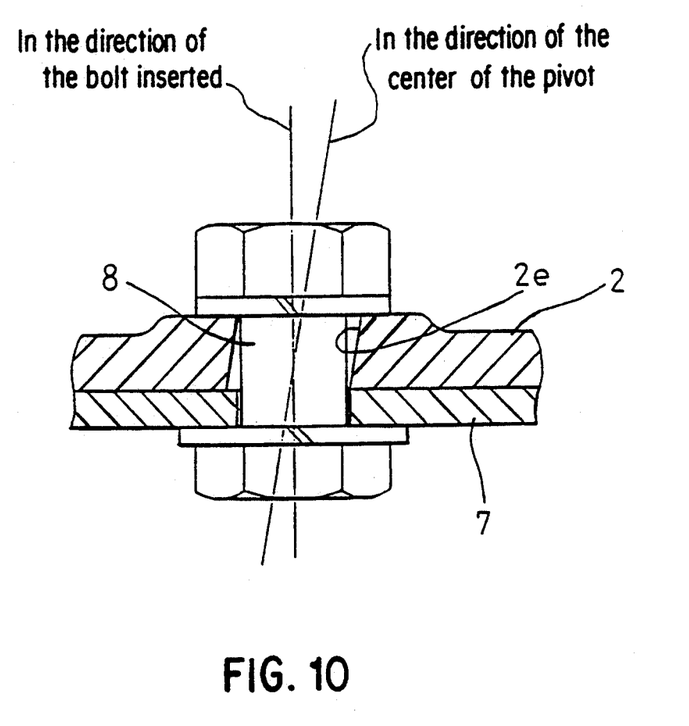
FIG. 10 is an enlarged cross-sectional view taken along 10—10 in FIG. 2.

Although, in the above arrangement, the third imaginary plane $P_3$ containing the axis A of the frame member 7 is mutually parallel with both the first imaginary plane $P_1$ containing the axis B of the sleeve 2a and the second imaginary plane $P_2$ containing the axis C of the sleeve 5a, the axis B of the sleeve 2a and the axis C of the sleeve 5a are not parallel with each other as shown in FIG. 7 which is referenced to the axis B and both axes further apart on the top side of the figure. The insertion directions of bolts 8, therefore, do not agree with the axes B and C of the sleeves 2a and 5a in FIG. 7. There may be a question about alignment between the direction of holes 2e and 5d for bolts, formed brackets 2 and 5, respectively, and the direction of the axes B and C, respectively. No problem will arise if bolt through-holes 2e and 5d, along the axes B and C, are set large enough to allow the bolts 8 pass through as shown in FIG. 10.

According to the embodiment of the present invention described above, the wiper device is of a modular-type made of the first and second brackets, both of which are connected with the frame. Thus, the wiper device is compact and light weight, and not so heavy and bulky as a full die-cast type of which an intermediate portion is also of die cast construction. Furthermore, in the above structure, the axis A of the frame member is so arranged that it is contained in the third imaginary plane which is parallel with the first and second imaginary planes, wherein the first and second imaginary planes are selected respectively from planes which contain the axis B of the first pivotal shaft 3 and from planes which contain the axis C of the second pivotal shaft so that the first and second imaginary planes are parallel with each other. The above arrangement allows the frame member to be of linear structure; the insertion directions of bolts attaching the frame member to both brackets t be made uniform; mechanical strength to be thus enhanced, and assembly efficiency to be excellent.

Furthermore, the connecting portions, formed on brackets to be connected to the frame member, may be set parallel with or perpendicular to the first pivotal shaft and the second pivotal shaft. The connection portions are formed together with brackets, using simple dies matched in reference to the axes of the first pivotal shaft and the second pivotal shaft. Therefore, there is no need for complex dies or special slide dies.

While this invention has been described in conjunction with specific embodiments thereof, it is evident that many alternatives, modifications and variations will be apparent to those skilled in the art. Accordingly, the preferred embodiments of the invention as set forth herein are intended to be illustrative, not limiting. Various changes may be made without departing from the spirit and scope of the invention as defined in the following claims.

What is claimed is:

1. A modular-type wiper device comprising:
   a first bracket having a first sleeve, a first mounting portion and a motor base portion, said first sleeve receiving a first pivotal shaft, said first mounting portion for securement to a vehicle's body and said motor base portion for supporting a wiper drive motor;
   a second bracket having a second sleeve and a second mounting portion, said second sleeve receiving a second pivotal shaft, said second mounting portion for securement to a vehicle's body, said first and second brackets being formed of a one-body die cast, said first and second brackets each having a connecting portion formed thereon; and
   a linear frame member having two end portions, each end portion of said linear frame member being connected to one of said bracket connecting portions to form a modular bracket construction, wherein the linear frame member has an axis contained in a third imaginary plane, said third imaginary plane being parallel to a first imaginary plane and a second imaginary plane, said first imaginary plane being selected from a plurality of imaginary planes containing said first pivotal shaft and said second imaginary plane being selected from a plurality of imaginary planes containing said second pivotal shaft, said first and second imaginary planes being parallel to one another.

2. The wiper device according to claim 1, wherein said one-body die cast is one of an aluminum die cast and a zinc die cast.

3. The wiper device according to claim 1, wherein a link arm is connected to each of said pivotal shafts, a first wiper link has one end attached to the link arm connected to said second pivotal shaft and a second wiper link is disposed between said link arms, an opposite end of said first wiper link being for attachment to a motor arm of a wiper drive motor shaft.

4. The wiper device according to claim 1, wherein holes extend through said bracket connecting portions and said linear frame member, and bolts extend through said holes to connect said bracket connecting portions to said frame member.

5. The wiper device according to claim 4, wherein said holes are oriented such that substantially aligned bolt insertion directions are provided.

6. The wiper device according to claim 5, wherein said holes have diameters which are sufficiently large to enable aligned bolt passage.

7. A modular-type wiper device comprising:
   a first bracket having a first sleeve, a first mounting portion and a motor base portion, said first sleeve receiving a first pivotal shaft having an axis, said first mounting portion for securement to a vehicle's body and said motor base portion for supporting a wiper drive motor;
   a second bracket having a second sleeve and a second mounting portion, said second sleeve receiving a second pivotal shaft having an axis, said second mounting portion for securement to a vehicle's body, said first and second brackets each having a connecting portion formed thereon; and
   a linear frame member having two end portions, each end portion of said linear frame member being connected to one of said bracket connecting portions to form a modular bracket construction, wherein one of said pivotal shaft axes appears as a straight line when said pivotal shafts are viewed such that the other of the pivotal shaft axes appears as a point, and the linear frame member has an axis which appears parallel to said straight line.

8. The wiper device according to claim 7, wherein said first and second brackets are formed of a one-body die cast.

9. The wiper device according to claim 8, wherein said one-body die cast is one of an aluminum die cast and a zinc die cast.

10. The wiper device according to claim 7, wherein a link arm is connected to each of said pivotal shafts, a first wiper link has one end attached to the link arm connected to said second pivotal shaft and a second wiper link is disposed between said link arms, an opposite end of said first wiper link being for attachment to a motor arm of a wiper drive motor shaft.

11. The wiper device according to claim 7, wherein holes extend through said bracket connecting portions and said linear frame member, and bolts extend through said holes to connect said bracket connecting portions to said frame member.

12. The wiper device according to claim 11, wherein said holes are oriented such that substantially aligned bolt insertion directions are provided.

13. The wiper device according to claim 12, wherein said holes have diameters which are sufficiently large to enable aligned bolt passage.

* * * * *